United States Patent [19]
Matto

[11] 3,832,090
[45] Aug. 27, 1974

[54] AIR COOLING OF TURBINE BLADES
[75] Inventor: Lawrence R. Matto, Shelton, Conn.
[73] Assignee: Avco Corporation, Stratford, Conn.
[22] Filed: Dec. 1, 1972
[21] Appl. No.: 311,290

[52] U.S. Cl. .................................. 416/95, 415/115
[51] Int. Cl. ............................................. F01d 5/08
[58] Field of Search ............................ 416/95-97; 415/115

[56] References Cited
UNITED STATES PATENTS

| | | | |
|---|---|---|---|
| 2,401,826 | 6/1946 | Halford | 416/214 X |
| 2,988,325 | 6/1961 | Dawson | 415/115 X |
| 2,999,668 | 9/1961 | Howald et al. | 416/97 |
| 3,017,159 | 1/1962 | Foster et al. | 416/90 |
| 3,565,545 | 2/1971 | Bobo et al. | 416/95 X |
| 3,575,528 | 4/1971 | Beam | 416/97 X |
| 3,588,277 | 6/1971 | Howald et al. | 416/97 X |
| 3,635,586 | 1/1972 | Kent et al. | 416/95 X |
| 3,712,756 | 1/1973 | Kalikow | 416/97 X |
| 3,742,706 | 7/1973 | Klampas | 416/97 X |
| 3,768,921 | 10/1973 | Brown et al. | 416/96 UX |
| 3,791,758 | 2/1974 | Jenkinson | 416/95 UX |

*Primary Examiner*—Everette A. Powell, Jr.
*Attorney, Agent, or Firm*—Charles M. Hogan; Gary M. Gron

[57] ABSTRACT

A gas turbine engine is described, particularly the turbine rotor portion thereof and the bearing for journaling this rotor. Cooling air is directed along passageways extending through the bearing mounting and discharged into an entry chamber at the inner portion of the rotor. The rotor includes an annular plate spaced from a disc on which the rotor blades are mounted. The inner periphery of the plate defines the entrance of a passageway means for the flow of cooling air from the entry chamber to and through the blades to cool them. Cooling air as it is directed into the entry chamber at an angle such that its tangential vector approximates the peripheral speed of the cooling air passageway entrances. Further, vanes are provided on the blades to facilitate flow of cooling air through the rotor passageway means.

4 Claims, 5 Drawing Figures

AIR COOLING OF TURBINE BLADES

The present invention relates to improvements in gas turbine engines and more particularly to improvements in cooling the turbine blades of such engines.

It has long been recognized that the temperatures of hot gas streams, generated in high performance gas turbine engines, in many cases, exceed the operational capabilities of any practical materials which are available to form certain engine components which are directly exposed to the hot gas stream. While there are materials which might withstand such temperatures, they are either too expensive to be practical, or their operational life is so greatly reduced that they become impractical from a standpoint of maintenance and reliability. This is particularly true of the blades of the first turbine stage of such engines. These blades are deployed at the discharge of the engine's combustor and are exposed to nearly the highest temperatures generated in an engine. The combination of elevated temperatures and the high stresses induced by rotation of the turbine rotors almost always subjects the turbine blades to the most hostile environment of the engine insofar as the structural requirements of materials are concerned.

Thus it has been that a great many proposals have been made to cool these turbine blades and many such proposals have been put into operational use. The primary and most practical cooling system to date has been based on flowing pressurized cooling air, usually derived from the discharge of the engine's compressor, through the blades and back into the hot gas stream. Such systems can and do effectively maintain the metal temperatures of the blades at levels substantially below the actual gas stream temperatures. In this way, it is possible to utilize practical, albeit highly advanced materials and alloys, in fabricating the blades and still obtain a reasonable operational life.

The use of a cooling air system for turbine blades, however, does involve inherent losses in the overall cycle efficiency of the engine. The cooling air, usually, must be pressurized to substantially the highest pressure level generated in the engine. The air extracted for cooling purposes represents air which cannot be utilized directly in the generation of the motive fluid stream and thus an efficiency loss. Further, it is desirable that the cooling air be at the lowest possible temperature level as it passes through the turbine blades in order that the amount of air extracted from the engine cycle be minimized. Other complications arise in the fact that the cooling air must be ducted from a generally remote, stationery area of the engine to the turbine rotor which rotates at extremely high speeds. These factors all contribute to complications in engine design and losses in engine cycle efficiency which offer a great potential for improvements in direct operating costs of such engines and other advantages for even relatively small improvements in the losses which are attributable to the turbine blade cooling system.

Accordingly, one object of the present invention is to improve the overall efficiency of cooling systems for turbine rotor blades of gas turbine engines and particularly blades used in the first turbine stage thereof.

Another object of the invention is to attain the above ends by improved efficiency in flowing cooling air through the turbine rotor to the turbine blades.

Another object of the invention is to attain the broader ends thereof through improvements in the flow of cooling air to a rotating turbine rotor.

Another object of the invention is to attain the above ends through improved mechanical structures with little or no increase in the cost of fabricating such structures.

The broader aspects of the invention are attained by a gas turbine engine comprising a turbine rotor having a plurality of blades projecting from its periphery. The rotor is provided with passageway means for directing cooling air from a central entrance radially outwardly to the bases of the blades and then through the blades. Means defining a chamber are provided at the inner portions of the turbine rotor, with the chamber exiting into the entrance to the cooling air passageway means. Further, means are provided for directing cooling air into this chamber at a direction and velocity which has a tangential vector approximating the peripheral speed of the central entrance of the cooling air passageway means.

Further, the rotor blades may be provided with tangs and the rotor may include a disc which is slotted across its periphery to receive the blade tangs, thereby removably mounting the blades on the disc. An annular plate may be mounted on the rotor disc and spaced from the upstream side thereof to define the central entrance of the cooling air passageway means as well as a portion of said passageway means. The tangs and blades would have communicating passageways therein to define the remainder of the cooling air passageway means. Additionally, the blade tangs would have vanes projecting from an adjacent surface of the disc towards said plate to facilitate the flow of cooling air through the cooling air passageway means.

More specific features of the invention include the employment of angularly spaced bolts adjacent the central entrance for securing the plate to the turbine disc as well as the provision of a sealing engagement between the plate and the blades to define the outer bounds of the passageway means for the flow of cooling air to the blades. Additionally, the plate may also serve to restrain axial movement of the blades.

Other features of the invention are found in the provision of a sealing member which is attached to a bearing mounting. The bearing journals an upstream extending shaft on which the turbine rotor is mounted for connection with the engine's compressor rotor. This sealing member co-operates with the sealing means integral with the rotor plate to provide a rotating gas seal for the outer bounds of the chamber into which cooling air is introduced.

Further, the sealing member may have angularly spaced pockets into which cooling air is introduced through passageways extending through the bearing mounting means. Cooling air is then discharged from these pockets between vanes which direct the cooling air at the desired angle and velocity.

The above and other related objects and features of the present invention will be apparent from a reading of the following descriptions of a preferred embodiment thereof, with reference to the accompanying drawings, and the novelty of the invention pointed out in the appended claims:

Figure 1:
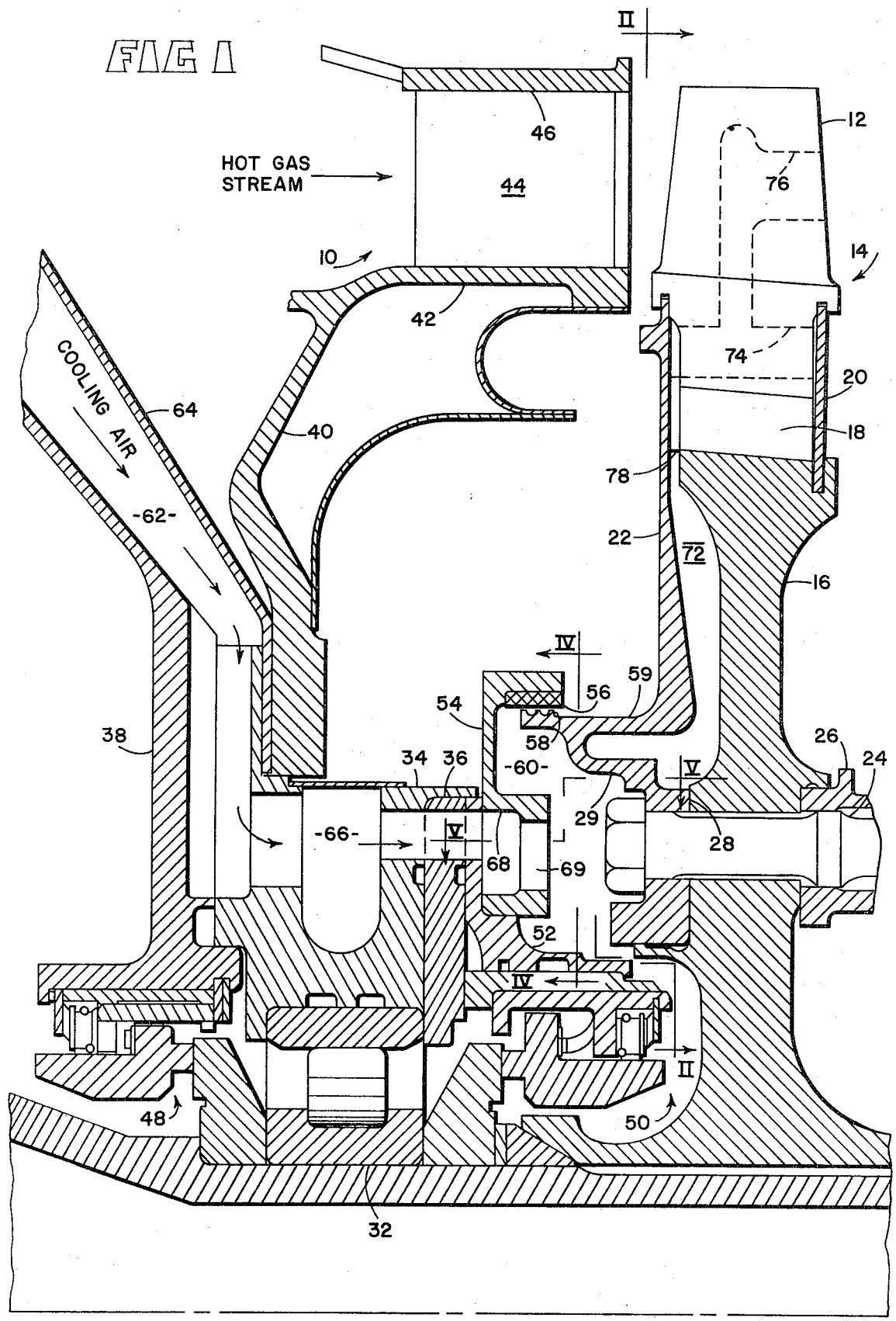
FIG. 1 is a longitudinal section of a portion of a gas turbine rotor support and cooling air system embodying the present invention.

FIG. 1 illustrates the combustor discharge portion of a gas turbine engine. A gas turbine engine of the present type includes, in series flow relationship, a compressor for pressurizing air, a combustor in which the pressurized air supports combustion of fuel to generate a high energy, hot gas stream and a turbine which extracts a portion of the energy of the hot gas stream to drive the compressor rotor in self-sustained operation. The remaining energy of the hot gas stream may be converted to a useful output by driving a power turbine to develop shaft power or by being discharged through a nozzle to generate a propulsive force.

FIG. 1 illustrates, by legend, the flow direction of the hot gas stream as it enters a turbine nozzle diaphragm 10. The nozzle diaphragm 10 directs the hot gas stream toward the blades 12 of a turbine rotor 14 to drive the rotor. The hot gas stream, in high performance engines, is at a temperature level which is beyond the operating capabilities of any practical materials the turbine blades 12 might be formed. The features of the present invention, as will later be apparent, are directed to cooling of these turbine blades.

Figure 2:
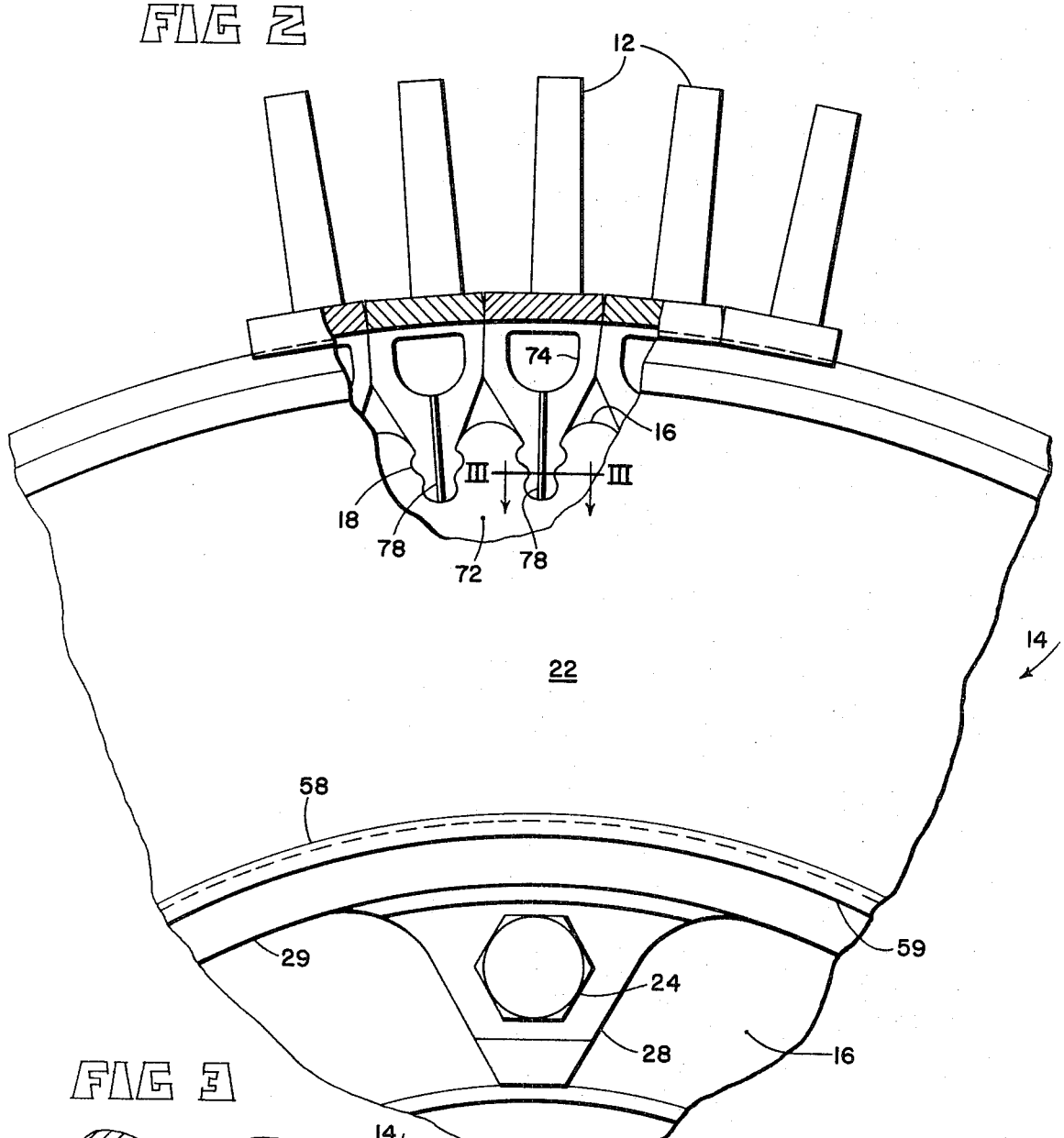
FIG. 2 is a section taken generally on line II—II in FIG. 1.

The turbine blades 12 are mounted around the periphery of a turbine disc 16. The blades 12 have integral tangs 18 which are received by correspondingly shaped grooves which extend across the outer periphery of the turbine disc 16. The downstream ends of the blades are axially restrained on the disc 16 by a ring shaped member 20 which is captured in grooves formed respectively in the disc 16 and the blades 12. The upstream ends of the blades 12 are locked by an annular retainer plate 22, the outer periphery of which extends into grooves formed in the blades 12. The retainer plate 22 is secured to the disc 16 by bolts 24. The bolts 24 may serve the dual function of bolting the disc (not shown) of a second turbine stage thereto through spacers 26. As is best seen in FIG. 2, the bolts 24 extend through lugs 28 formed on the plate 22 and projecting inwardly from the inner periphery 29, thereof. The turbine disc 16 is secured, as by a spline connection, to a shaft 30. The shaft 16 extends to and provides the driving connection for the compressor rotor, as above referenced.

Adjacent the turbine rotor is a bearing assembly for journaling the shaft 30. This bearing assembly includes a roller bearing 32, the inner race of which is telescoped over the shaft 30 and the outer race of which is captured within a bearing housing 34 by a retainer plate 36. The bearing housing 34 is secured to or supported by an engine frame member 38. Also mounted on the frame 38 is a frame 40 which further comprises an inner shroud member 42 of the nozzle diaphragm 10. The vanes 44 of the diaphragm 10 extend from the inner shroud 42 to an outer shroud 46.

On the upstream side of the bearing 32 is a seal assembly 48 mounted on a portion of the frame 38. On the downstream side of the bearing 32 is a seal assembly 50 which is supported by a mounting plate 52 secured against the bearing retaining plate 36. Secured against the outer portions of the plate 52 is a seal member 54 having a flanged seal surface 56 overlying labrynth teeth 58 which are formed on a projecting flange 59 of the plate 22. This provides a rotary seal for an annular chamber 60 surrounding the inner portion of the upstream side of the turbine disc 16.

Figure 4:
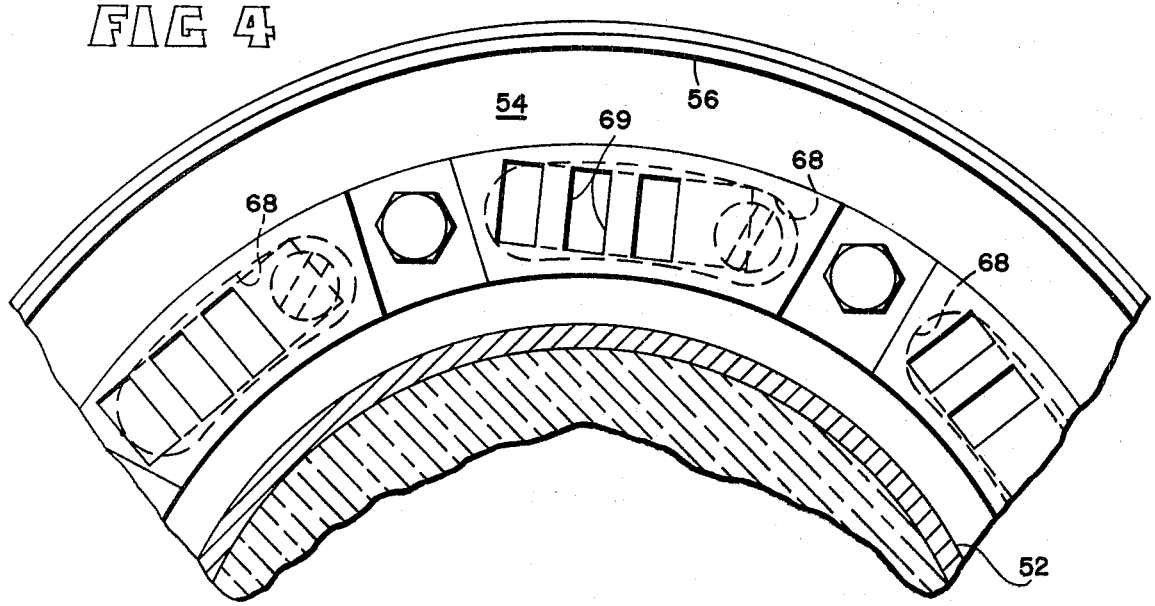
FIG. 4 is a section, taken generally on line IV—IV in FIG. 1.
Figure 5:
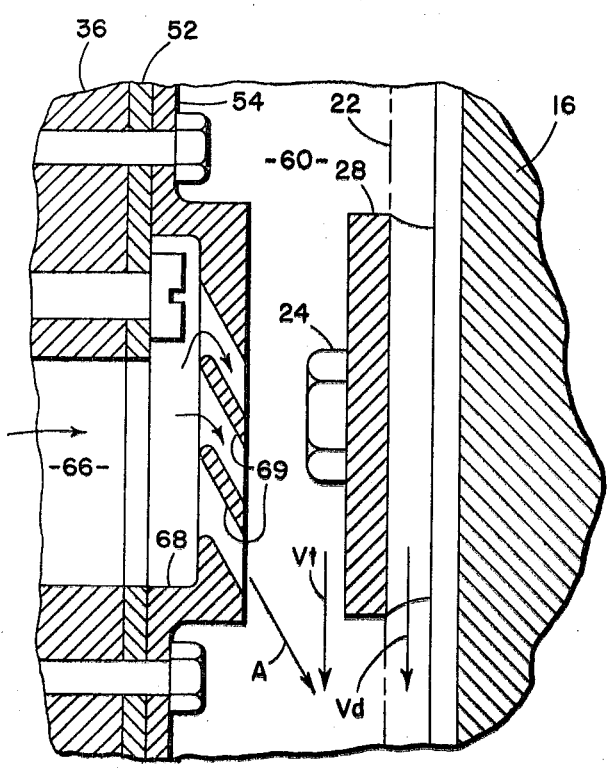
FIG. 5 is a radial projection taken generally on line V—V in FIG. 1.

The cooling air system comprises a passageway 62, formed in part by a portion of the frame 38 and a sheet metal plate 64, which connects with a source of pressurized cooling air, preferably derived from the compressor discharge of the engine. The passageway 62 extends to a central passageway which is compositly formed through the bearing housing and associated components and may include several parallel branches leading to the entry chamber 60. As can be seen from FIG. 1, the compositly formed passageway 66 extends through a bearing housing 34, the retainer plate 36 and the seal assembly plate 52 to pockets 68 formed in the seal member 54, see also FIGS. 4 and 5. The cooling air is directed from the pockets 68, by outlet vanes 69 into the chamber 60 in an angular direction and at a velocity, represented by Arrow A, such that the tangential component, vector $V_t$, thereof approximates the peripheral speed, vector $V_d$, of the adjacent portion of the turbine rotor disc 16. The result of this relationship is that there is a minimum of relative motion, or windage, losses as the air passes between the lugs 28 into the entrance (at periphery 29 of plate 22) of a radial flow channel 72 defined by the spaced relationship between the blade 22 and disc 16. The cooling air then flows to cross passageways 74 formed in the outer portions of the blade tangs 24. From the passageways 74, the cooling air then enters the interior of the blade 12 and provides a cooling mechanism therefor by flowing through the interior of the blade, as is generally indicated by the passageway 76, for ultimate discharge into the hot gas stream.

Figure 3:
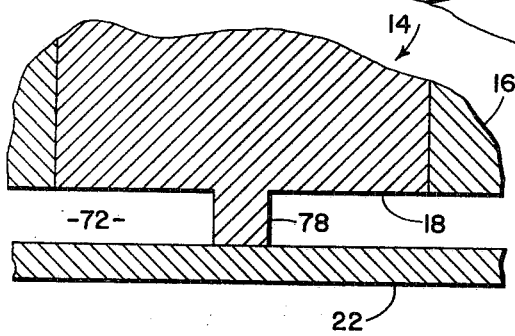
FIG. 3 is a section, on an enlarged scale, taken on line III—III in FIG. 4.

Not only are entry losses of the cooling flow to the passageway 72 minimized, but the overall efficiency of the cooling air system is further enhanced by the provision of pumping vanes 78 which project from the ends of the blade tangs 18. As is particularly shown in FIG. 2 and 3, the ends of the tangs 18 are generally flush with the adjacent portions of the disc 16. The vanes 78 project therefrom across the passageway 72 into contiguous relationship with the retainer blade 22.

Variations in the preferred embodiment disclosed herein will occur within the spirit and scope of the broader aspects of the present inventive concepts which are therefor to be derived solely from the following claims.

Having thus described the invention, what is claimed as novel and desired to be secured by Letters Patent of the United States:

1. A gas turbine engine comprising:
   a turbine rotor including a disc journaled for rotation and having a plurality of slots across the periphery thereof,
   a plurality of blades projecting from the periphery of said rotor and having tangs positioned in said slots to removably mount the blades thereon, each of said blades having cooling passages originating in said tangs, an annular plate spaced from the upstream side of said disc and defining in combination therewith a passageway extending radially from a central entrance defined by the inner periphery of said plate, said tangs having vanes projecting from the upstream surface of said rotor and abutting said plate to induce flow of cooling air through cooling passages in said blades, means defining a chamber exiting into said central entrance, and means for directing cooling air into said chamber at a direction and velocity having a tangential vector approximately that of the peripheral speed of said rotor entrance.

2. A gas turbine engine as in claim 1 wherein said plate is secured to said disc by angularly spaced bolts adjacent said central entrance, the outer peripheral portions of said plate sealingly engage said blades and restrain same against axial movement, said tang passageways open toward said plate between the outer peripheral portions thereof and said vanes and said vanes are in the form of a single, radially extending vane projecting from each tang.

3. A gas turbine engine as in claim 1 further comprising:

shaft means extending in an upstream direction and to which said disc is secured, a bearing adjacent said disc for journaling the upstream extending shaft means, bearing housing means supported by structural element of said engine, a sealing member secured to said bearing housing means and defining, in part, said chamber, and sealing means cooperatively formed on said sealing member and said plate for sealing the outer bounds of said chamber.

4. A gas turbine engine as in claim 3 wherein said sealing member has angularly spaced pockets therein with a radial distance from the axis of said shaft means approximating the radial distance of the central entrance therefrom and passageway means extending through said bearing mounting means for connecting said pockets with said source of cooling air, said pockets further being characterized by angled outlets for discharging cooling air into said chamber at said direction and velocity.

* * * * *